United States Patent [19]

Brown

[11] Patent Number: 5,909,256
[45] Date of Patent: Jun. 1, 1999

[54] TELECOMMUNICATION SYSTEM FOR TRANSMITTING AND RECEIVING NON-COMPRESSED HIGH RESOLUTION ANALOG SIGNALS

[76] Inventor: Robert T. Brown, 7915 Hollywood Way, Sun Valley, Calif. 01352

[21] Appl. No.: 08/644,010

[22] Filed: May 9, 1996

Related U.S. Application Data

[63] Continuation-in-part of application No. 08/235,358, Apr. 29, 1994, abandoned.

[51] Int. Cl.⁶ .................................................. H04N 7/01
[52] U.S. Cl. ........................................ 348/723; 348/426
[58] Field of Search .................................. 348/384, 390, 348/845, 426, 723, 724; 332/10, 124 R, 145

[56] References Cited

U.S. PATENT DOCUMENTS 4,736,240  4/1988  Samuels ................................. 348/708

*Primary Examiner*—Nathan Flynn

[57] ABSTRACT

A telecommunication system for wideband analog input video signals, data signals, facsimile signals, and the like which comprises a synchronous pixel analog modulator circuit for converting the wideband analog input signals into a multi-bit multi-level discrete code signal, and a transmission gate modulator circuit for modulating the multi-level discrete code signal on a carrier at high speed and within a limited bandwidth.

4 Claims, 2 Drawing Sheets

TELECOMMUNICATION SYSTEM FOR TRANSMITTING AND RECEIVING NON-COMPRESSED HIGH RESOLUTION ANALOG SIGNALS

This application is a Continuation in Part of application Ser. No. 08/235,358 filed Apr. 29, 1994 now abandoned, in the name of the present inventor.

BACKGROUND OF THE INVENTION

The present invention is concerned with a telecommunication system for the transmission and reception of wide band analog information signals such as video, data, facsimile signals, and the like.

The system of the invention was conceived for the purpose of transmitting and/or recording high definition video and audio signals and other data signals is particularly directed to a system, to be designated herein as a component direct transgated video (CDTV) system which provides for the pickup, processing, storage, transmission, reception and presentation of high speed data in analog mode.

The system of the invention was conceived for the purpose of transmitting and/or recording high definition video and audio signals and other data signals. The system was devised specifically for the purpose of transmitting high quality video information without the inherent problems encountered in prior art systems. The system of the invention responds to standard video information and operates in the component mode of red, green and blue, plus sync, audio and other components. The system allows a resolution of over 1600 lines per color. The system may be applied to existing communication systems such as satellite and wide-band terrestrial. The uniqueness of the system, which will be discussed and explained, is that it provides a very narrow band transmission signature thus allowing stacking or multiple carrier utilization.

The input of the system is based on the utilization of video component channels, whether they be derived from standard signals such as NTSC, or originated or developed by an advanced camera technology. The signals are generated and processed through the system and transmitted via a carrier to a satellite, for example. The signals are then returned to the receiver portion of the system in which they are reconverted and displayed on standard monitors in red, green and blue, or projected on high resolution screens that can be constructed up to but not limited to 40 feet.

The resolution capability of the system is over 2400 lines per color. The signal-to-noise requirement for satellite use is about 24 db signal-to-noise ratio which is substantially half the requirements of conventional prior art television systems. Prior art television signals in standard transponders require about 56 db signal-to-noise ratio in order to produce a broadcast quality picture. Even with its signal-to-noise requirement of 24 db, the system of the invention provides a signal-to-noise ratio in video of about 60 to 65 db, even though the carrier only has a ratio of 24 db signal-to-noise ratio.

The audio portion of the processed signal may be carried in the form of a standard AES/EVU digital signal, and the system also carries, for example, command signals which are standard FM channels for sub-audio or informational codes. The system by its own uniqueness of operation provides its own encoding. The system allows interpolation to standard formats such as NTSC, PAL, SECAM by computer conversion, or interpolation of the component signals. The base frequencies of operation are designed so that existing formats and future formats of encoding systems such as SECAM or PAL operate on a base frequency to which the base frequency used in the system of the invention can be interpolated out at any given frame rate or field rate.

It is accordingly a general object of the present invention to provide a system which incorporates the features and advantages described above and which is capable of receiving signals from high speed data sources and of transmitting the signals without compressing or limiting the resolution or quality of the signals.

Another objective of the invention is to provide a system which incorporates a standard of encoding that is universal for presentation formats.

Still another object of the invention is to provide a system capable of expansion and integration of existing and future formats of data and information sources for transmission and storage.

A feature of the invention is the use of the component values of input video to maintain a 256 gray scale level, and a resolution of 1600 H by 1280 V pixels per color. A particular embodiment of the invention utilizes 640 H by 480 V component video with dual sub-carrier stereo audio, and AES/EBU data.

A general objective of the invention is to provide a system which is capable of pick-up, processing, storage, transmission, reception and presentation of high speed data in analog mode.

The system of the invention, unlike the prior art systems, does not require the large bandwidth commonly associated with the type of data communications under consideration. The system of the invention has a feature in that it permits, but is not limited to, the transmission and reception of non-compressed, ultra high resolution, video and multi-channel signals over existing communications satellites. Because of the narrow bandwidth requirements of the system of the invention, the signals may be stacked for multi-channel access without any corresponding loss of signal quality or resolution which is normally encountered when compression techniques are used.

The transmitter portion of the system of the invention includes a transmission gate modulator circuit, and a synchronous pixel analog modulator (SPAM) circuit. The synchronous pixel analog modulator circuit converts analog input signals into a 4-bit (GRBA) digital signal, and the transmission gate modulator circuit provides for the modulation of the 4-bit (GRBA) signal on a carrier generated at the transmitter. The analog input signals may, for example, be television, facsimile, data signals, and the like.

The transmission gate modulator circuit of the invention provides a unique mode of carrier modulation by high speed digitally encoded data within a limited bandwidth, this being achieved without loss of quality and without signal degradation. The circuit is designed to avoid inherent loss of signal quality due to harmonic aberrations which are encountered in most prior art modulators.

The transmission gate modulator circuit of the invention achieves its objectives through the use of digital techniques. Digital encoding of analog input signals is accomplished in the transmission gate modulator circuit by the synchronous pixel analog modulator (SPAM) circuit, which will be described in detail in the following specification. The SPAM circuit provides a standard of encoding of the analog input signals into a digital code which is universal for presentation formats.

The SPAM circuit uses the component values of input video signals to maintain a 256 gray scale level, and a resolution of 1600 H×1280 V pixels per color. The SPAM circuit utilizes synchronous comparison of the data levels of the analog input signals which are summed to provide a 4-bit 16-level continuous pixel perfect code. The transmission gate modulator circuit receives the digitally coded signals from the SPAM circuit and it triggers the enable gate of a phase coherent oscillator included in the transmission gate modulator circuit. The phase coherent oscillator is constructed to emit a phase coherent signal burst at a predetermined frequency which is directly proportional to the levels and timings of the digitally encoded trigger signals received from the SPAM circuit.

Figure 1:
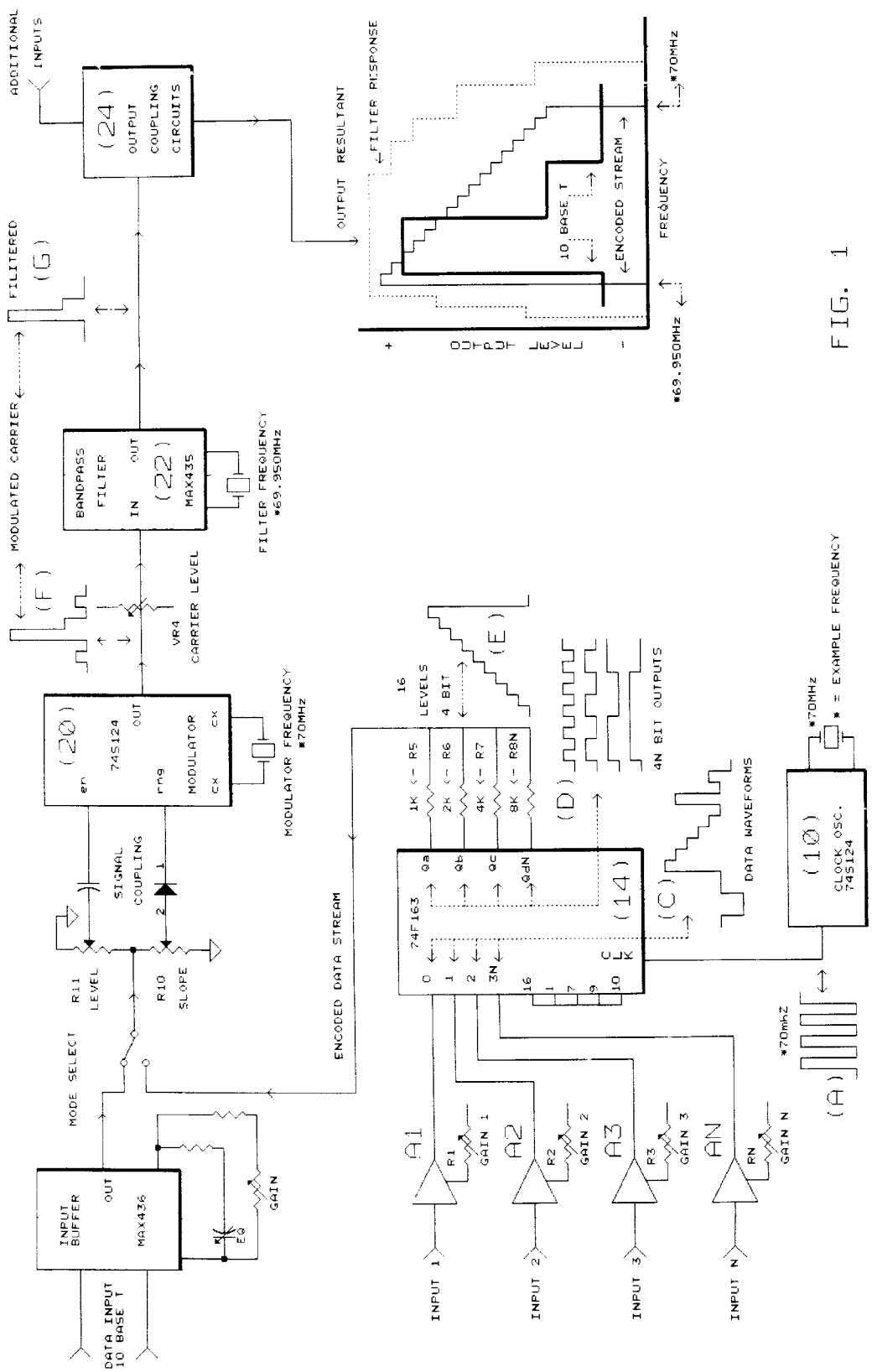
FIG. 1 is a block diagram of a synchronous pixel analog modulator (SPAM) circuit and a transmission gate modulator encoder circuit which incorporates the principles of the invention in one of its embodiments.
Figure 2:
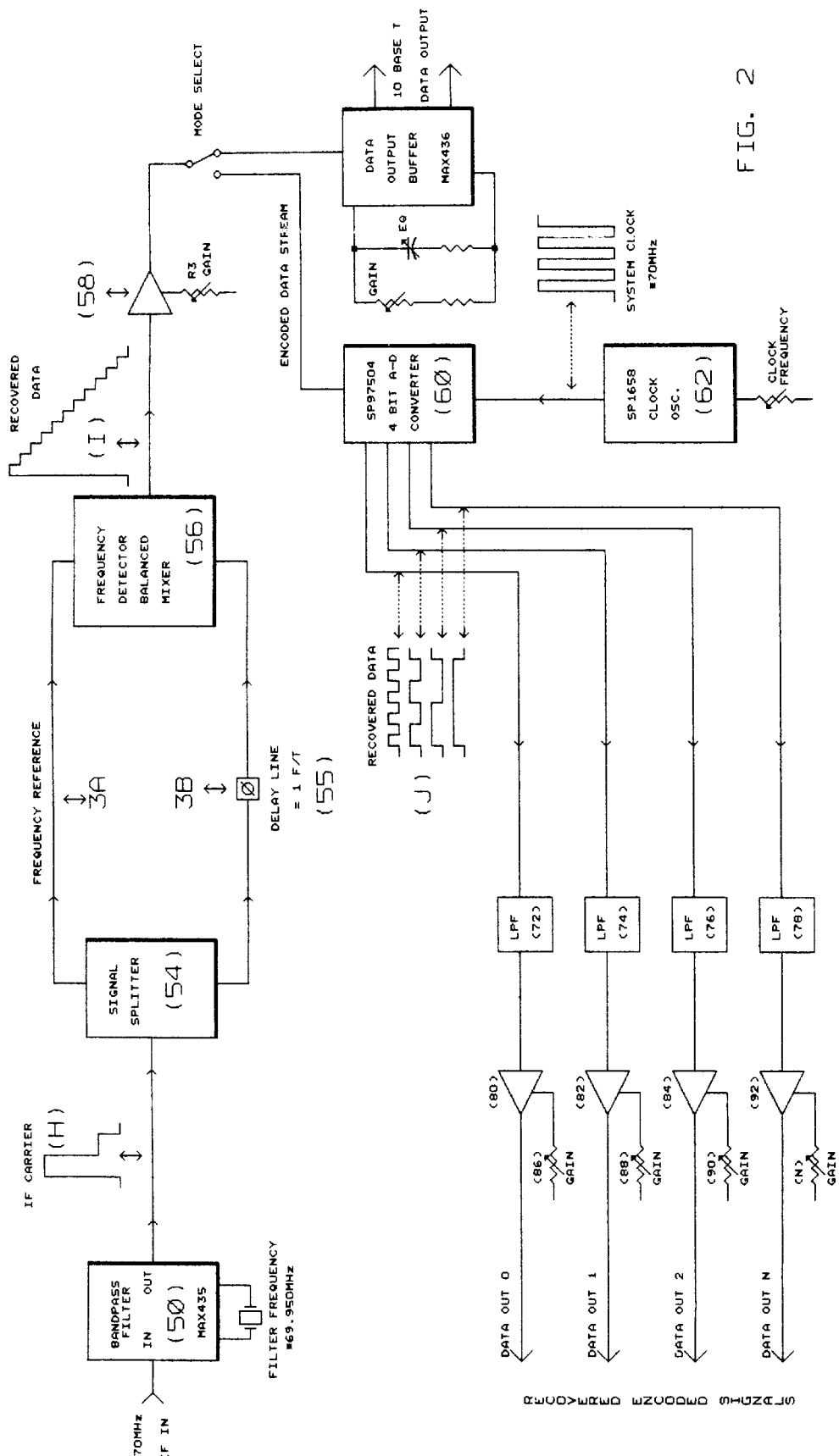
FIG. 2 is a block diagram of a decoder system for decoding signals received from the transmission system of FIG. 1.

The various elements of the systems of FIGS. 1 and 2 are shown in block form because the elements are formed by well known integrated circuits. For that reason it is believed that a detailed circuit description of the various elements is unnecessary.

DETAILED DESCRIPTION OF THE ILLUSTRATED EMBODIMENTS

Referring now to the drawings, and particularly to FIG. 1, it will be seen that FIG. 1 shows a clock oscillator 10 which operates at 27 MHz. The clock oscillator may be an integrated circuit of the type designated 78S124, and it is constructed to generate a train of clock pulses indicated by the wave-form (A). The clock pulses from the clock oscillator 10 are used to drive an 8-bit counter 256-level ramp generator 12, which may be of an integrated circuit of the type designated 74S579. The ramp generator 12 generates a 256-level ramp signal, wave-form (B). This signal is passed to a quad comparator 14 which, in conjunction with a summing network forms a 4-bit, 16-level ramp, shown by the wave-form (E) which is modulated by signals shown in the wave-form (C), as will be described. Quad comparatory 14 may be an integrated circuit of the type designated SP93504.

The 16-level ramp (E) is applied to a buffer amplifier 18 whose output terminal is capacitively coupled to the enable gate of a phase coherent oscillator and ampliphase modulator represented by block 20. The gain of buffer amplifier 18 is controlled by a potentiometer R11. In addition, a slope control potentiometer R10 may be provided. The phase coherent oscillator and ampliphase modulator of block 20 may be an integrated circuit of the type designated 74S124.

In the system of the present invention, wave-form (E) is a multi-bit multi-level discrete code signal which is introduced to block 20 in which it is modulated on a carrier of, for example, 81 MHz. Block 20 includes the carrier oscillator which produces a phase coherent burst of carrier signal at its carrier frequency, and which is directly proportional in time and amplitude to the inputted multi-bit multi-level discrete code signal (E). The carrier oscillator in block 20 contains an enable gate, and the multi-bit multi-level discrete code signal (E) is applied to the enable gate to provide a directly proportional carrier output (amplitude modulation) for the multi-bit multi-level discrete code signal. The frequency slope control provided by resistor R10 sets the modulation index (phase modulation) to the selected bandwidth. Accordingly, the circuit provides amplitude/phase modulation which is termed herein as "ampliphase" modulation. The block 20 produces a phase coherent signal burst at the predetermined carrier frequency of, for example, 81 MHz. This signal burst is directly proportional to the ramp signal (C) applied to the enable gate of the oscillator in block 20. The (ST*) ampliphase modulation technique performed by block 20 produces a modulation envelope (wave-form F) which is of a narrow bandwidth, for example, less than 3 MHz.

Integrated circuit 74S124, as stated in its published specification sheet, features two independent voltage-controlled oscillators (VCO) in a single monolithic chip. The input frequency of each VCO is established by a single external component, either a capacitor or a crystal in combination with two voltage-sensitive inputs, one for frequency range and the other for frequency control. These inputs can be used to vary the output frequency. These highly stable oscillators can be set to operate at any frequency, typically between 0.12 Hz and 85 MHz. The enable input of these devices starts and stops the output pulse when it is low or high, respectively. The internal oscillator of the 74S124 is started and stopped by the enable input. The pulse synchronization gating section of the circuit insures that the first output pulse is neither clipped nor extended.

The signal from block 20 (wave-form F) is passed through a carrier level setting potentiometer VR4 to a band-pass filter 22 which removes any unwanted spurious artifacts and images. The filtered ampliphase modulated carrier signal from the band-pass filter 22 (wave-form G) is introduced to intermodulation coupling circuit 24 to be mixed with a 70 MHz IF signal for normal satellite transmission.

In the circuit of FIG. 1, green, red and blue video inputs (1), (2) and (3) are introduced to respective buffer amplifiers $A_1$, $A_2$ and $A_3$. The horizontal (H) and vertical (V) sync input signals (4) and (5) are introduced to an exclusive NOR gate integrated circuit 24A, 24B of the type designated SP93504. Audio signal inputs are frequency modulated on 4.5 MHz and 5.2 MHz carriers in a modulator 26. The gains of amplifiers $A_1$–$A_4$ are applied to corresponding input terminals )b, 1b, 2b and 3b of quad comparator 14. The outputs of ramp generator 12 are applied through a ramp reference potentiometer $VR_1$ to terminals 0a, 1a, 2a and 3a of quad comparator 14.

To insure synchronism in the system, the 27 MHz clock oscillator 10 of FIG. 1 drives the ramp generator 12 which may be of the type designated 74F579. Oscillator 10 is a highly stable crystal controlled oscillator of the type designated 74S124, and it includes an harmonic coincidence circuit for locking the input data signals to a house camera sync reference. This reference may be a color subcarrier generator or computer depending upon the input signals required.

The output clock signals from clock oscillator 10 (wave-form A) are inputted to ramp generator 12, as described above. The ramp generator 12 is configured to produce an 8-bit, 256-level ramp. This ramp (wage-form B) and the output signal (wave-form C) from amplifiers $A_1$–$A_4$ are fed to quad comparator 14. The quad comparator 14 is also driven by clock oscillator 10 through an ECL buffer of the type designated SP92701, connected to the CLK and S terminals. This allows each of four internal comparators in the quad comparator 14 to sample the difference between the ramp from ramp generator 12 and the analog levels of the inputted data from the amplifiers $A_1$–$A_4$. The quad comparator 14 develops four synchronous outputs (wave-form D) which are equal to the data input level. Each of the four outputs represents the 8-bit, 256-pixel level which corresponds to the individual pixel gray scale of the video data acquired from the imaging source.

The four outputs of the quad comparator 14 are summed together in a summing network to form the 4-bit, 16-level discrete digital code signal (wave-form C). This summing network is formed by 1K, 2K, 4K and 8K resisters R5, R6, R7 and R8.

As stated above, gates 24a, 24b form an integrated circuit of the type designated 74LS2661. This circuit is configured so that vertical sync, horizontal sync, and AES/EBU or audio carriers can be combined into one signal source. This signal source provides sync, data communication and audio carriers. The gate circuit 24a, 24b operates such that the vertical sync is switched into the circuit with the horizontal sync, and the data communication and audio carriers are also switched into the circuit. A dual timer 26, which may be an integrated circuit of the type designated NE556, is used to produce 4.5 and 5.8 MHz carriers which are frequency modulated at COM1 and COM2 levels. These carriers are utilized for standard audio, information timing, or data signals.

The output from integrated circuit 24a, 24b, is fed to amplifier $A_4$. There are four amplifiers $A_1$–$A_4$ included in the circuit. These are buffer amplifiers of 350 MHz bandwidth. The amplifiers are set by gain controls $R_1$–$R_4$ for the video portion, and they have approximately a six db gain in order to bring the level to 0.7 volts (which is the common monochrome portion of the color information, red, green and blue) to provide approximately 2.5 volts peak-to-peak for the encoding process.

Oscillator 10 is the base oscillator, and it has two sections. The first section is used as a master clock (wave-form A) of a frequency of 27 MHz. This frequency was selected to provide the sample rates for video at very high speed, and also to be able to be interpolated to existing services such as HDTV which has a clock frequency of 13.5 MHz. Moreover, the system may be brought down and interpolated to NTSC, PAL or SECAM depending upon the output requirements. The disadvantage of such interpolation is that losses result in video quality due to the low resolution of standard video. However, the technique serves to provide a service if required for low quality video such as for broadcast use. Ramp generator 12 serves as a base reference for the synchronous pixel analog modulator circuit, which is the encoding portion of the system. The output of ramp generator 12 is controlled by a gain control potentiometer (VR1), which sets the reference to approximately 2.5 volts peak-to-peak. This is the same reference as that of the buffer amplifiers $A_1$–$A_4$ whose gains are set to approximately 2.5 volts by potentiometers $R_1$–$R_4$.

The 0a–3a and 0b–3b inputs of quad comparator 14 operate as a gate which serves to compare the ramp of wave-form B and the individual signals of save-form C. The output of the AND gate comparator is the ratio of voltage at the time of loading of the video level that has been inputted. Thus, a comparison is made of the instantaneous video input level and the corresponding ramp level. Therefore, an exclusive reference or number is set up which is loaded into the quad comparator. This is carried out by each of the multiplexer channels which constitute a 4-bit system (wave-form D). Bit 1 is the green channel or most significant; bit 2 is the red channel; bit 3 is the blue channel; and bit 4 is the audio and sync channel. These four individual outputs are summed in network R5–R8 to produce the 16-level ramp output signal (wave-form E) which represents the comparisons of all the input data and audio.

The ramp signal output (wave-form E) from the mixer R5–R8 is applied to buffer amplifier 18 which, like the other buffer amplifiers, may be of the type designated CLC400S. Buffer amplifier 18 drives the pulse synchronized modulator section of the circuit of block 20. The enable input circuit of the oscillator section of block 20 responds to the signal of wave-form E to turn the oscillator section on and off. The enable input circuit allows the signal of wave-form E to start and stop the oscillator section in accordance with the modulation technique of the invention. As mentioned above, potentiometer R10 sets the slope/deviation of the modulator section of block 20.

By utilizing the pulse synchronized gate modulation section of block 20, the output pulses are neither clipped nor extended, this being one of the problems associated with conventional prior art modulators. As each of the 16-levels of the ramp signal of wave-form E turns the oscillator of block 20 on and off, each level of the ramp signal also sets the level of the output signal from the oscillator to a corresponding value. Since the system does not directly modulate the signal (i.e., FM), block 20 performs what has been termed herein as an "ampliphase-type modulation." That is, the oscillator signal of block 20 is FM modulated; however, it is also amplitude modulated in the sense that it has a level of carrier which is directly proportional to the input signal fed to the enable circuit of block 20. The foregoing results in the production of a narrow band reference pulse of carrier frequency of the order, for example, of 81 MHz. The frequency of 81 MHz was chosen in the embodiment under consideration as an appropriate frequency for placing the output signal of wave-form F on a conventional satellite carrier.

The conventional satellite system that is used may be a standard I.F. of 70 MHz NTSC video signal with conventional 6268 audio and at the 81 MHz portion of the narrow band 16-bit code. The ampliphase modulated signal is now fed through carrier level gain control VR4 to bandpass amplifier 22. The bandpass amplifier removes all subharmonics and anomalies associated with the modulation technique described above. Accordingly, a fully filtered narrow band ampliphase carrier is generated. This carrier is unique in that it represents a form of frequency modulation but it is also level. Therefore, it may be amplitude detected through FM detection techniques which have been referred to as "ampliphase" herein.

The output of the bandpass filter 22 is coupled to a specialized intermodulation coupling coil 24 which permits the system to input a standard 70 MHz satellite or subcarrier system. The output of block 24 is a composite 70 MHz with the 81 MHz CDTV modulation system. This composite 70 MHz output of block 24 is transmitted to the receiver/decoder portion of the system which is shown in FIG. 2.

As shown in FIG. 2, the 70 MHz I.F. input from the transmitter section of FIG. 1 is passed through another bandpass filter 50 which eliminates all communication signals other than the 81 MHz ampliphase CDTV data signal from the transmitter section of FIG. 1. The output of filter 50 (wave-form H) is applied to another CLC400 wideband amplifier 52 that is configured to drive a signal splitting network 54. Frequency detection is used which is a lag or lead of the actual 81 MHz code. This is accomplished by splitting the signal evenly and transmitting the split signal through a reference line 3A and through a delay line 3B. The delay line 3B can be set to either lag or lead the bit code that is modulated on the CDTV carrier.

The signals from the reference line 3A and delay line 3B are applied to a balanced mixer 56 which operates as a frequency detector or discriminator. The difference in the bit characteristic produces the original 16-level 4-bit ramp (wave-form I). This ramp is fed through a CLC400 buffer amplifier 58 to set the gain to drive a 4-bit high speed 110 MHz analog-digital converter 60. The converter 60 is driven by a 100 MHz oscillator 62 to produce the 4-bit code (wave-form J) for further processing. Converter 60 is an integrated circuit of the type designated SP 97504, which is a high speed 4-bit expandable analog-digital converter. The converter can operate at sample rates up to 110 MHz with analog inputs well above Nyquist frequencies. The output of the analog-digital converter 60 (wave-form C) are transmitted to SPAM decoder circuits 64, 66, 68 and 70 respectively. The SPAM decoders are data regenerators.

Each decoding circuit 64, 66 and 70 utilizes a CPM404 quad comparator which in part is set up as a ramp generator that converts the recovered data (wave-form C) to analog levels which are directly proportional to the original encoding levels of the video or data that was inputted into the encoding circuit in the transmitter of FIG. 1. Each decoder circuit includes a window detecting system so that a low and high limit can be set to take care of any anomalies such as noise that are produced through transmission. The outputs from the decoders 64, 66, 68 and 70 are fed through respective low pass filters 72, 74, 76 and 78. each of the low pass filters is set to 24 MHz to remove any residual carrier or clocking information. The outputs of the low pass filters 72, 74 and 76 are applied to respective CLC400 buffer amplifiers 80, 82 and 84 in which the gain is set for normal output of 0.7 volts (red, green and blue) by potentiometers 86, 88 and 90.

The output of low pass filter 78, which represents the sync, data and audio bits, is fed to a CLC400 buffer amplifier 92 and the buffer amplifier feeds a sync separator 94. The separator circuit 94 serves to separate the horizontal and vertical sync for the purpose of driving a conventional display device from output terminals 5 and 6. The separator circuit also separates the AES/EBU data for further conversion to the multi-channel audio capability by output terminal 6. This circuit also separates the FM communication channels which are then applied to a NE566 dual COMM demodulator 96 which produces the outputs COM1 and COM2 at output terminal 7 and 8. The system actually may contain six channels of audio information or data. The outputs of buffer amplifiers 80, 82 and 84 are fed to the display device from output terminals 1, 2 and 3. The audio data outputs are fed to whatever reproducing system is used for that purpose.

The signal splitter 30 may be a tri-filer wound toroid transformer, whose operating frequency is centered at the operating frequency of the modulation envelop (E). The outputs of the transformer follow the two distinct paths 3A and 3B. As explained above, the first path 3A is set and fixed, and it is used as a reference timing path which is equal to the modulation base frequency. The second path 3B includes the adjustable delay line 55 and, as mentioned above, the delay line may be tuned to be ahead or behind the reference path 3A. This lag/lead tuning process is set to a constant value depending upon the modulation sense desired. The outputs of the path 3A, 3B are summed by two matched diodes included in the frequency discriminator balance mixer 56. The output for mixer 56 is the 16-level ramp 4-bit (B) which corresponds to the original 4-bit, 16-ramp (E) of FIG. 1, and which represents the data stream.

An advantage of the detection circuit described above is the speed of data acquisition. The detector is constant and does not require a lock time which is normally associated with the prior art phase-lock loop type of detection circuit. The data stream (wave-form B) is amplified by the CLC400 buffer amplifier 38 whose gain and DC offsets are adjusted by a potentiometer R3 to the operating parameters of the 4-bit analog-digital converter 60. Converter 60 is designed to maintain high accuracy at high analog input frequencies. As mentioned above, the converter is able to convert sample rates with analog inputs above Nyquist frequency. The resulting outputs from the analog-digital converter 60 are the original 4-bit GRBA (B*) signals (wave-form C) derived from the encoder circuit of FIG. 1. These outputs are routed for further processing in the circuit of FIG. 2, as described above. The sample rate is established by clock oscillator 62 which is set to 108 MHz (4XSR). The clock oscillator 62 may be an integrated circuit of the type designated SP1558.

Recovery of the discrete digital code signal is accomplished by applying the signal from the transmitter to the high speed 4-bit analog-digital converter 60. Converter 60 is designed to maintain high accuracy at high analog input frequencies. The converter is capable of converting at sample rates with analog inputs above Nyquist frequencies, as explained above. Clock oscillator 62 is set at four times the sample data rate which in the embodiment being described is 108 MHz.

The resulting outputs from the analog-digital converter 60 are the original pixel samples in an 8-bit 256-level gray scale data stream. Recovery of the video (or data) signal is accomplished by the linear ramp regeneration decoder circuit 64, 66, 68 and 70. The linear ramp is generated in each decoder circuit by charging a capacitor to the original pixel voltage level and holding the charge at that level until the next pixel level occurs. These circuits produce the same pulse or square wave information exhibited by the original encoded pixel image. A window comparator is also incorporated into each of the linear ramp regenerator circuits 64, 66, 68 and 70. This window comparator performs as a white and black clipping circuit to remove any noise or abnormalities incurred in the recovery or transmission process. The four outputs from the decoder circuits 64, 66, 68 and 70 are introduced to the low-pass filters 72, 74, 76 and 78, each of which is set for a 24 MHz cut-off frequency. The low-pass filters remove any residual carrier noise that may be generated in the recovery process.

The invention provides, therefore, a system for enabling the pick-up, processing, storage, transmission, reception and presentation of high speed data in analog form. The system does not require the large bandwidths commonly required by conventional data communication systems of the prior art. Specifically, the system of the invention enables the transmission and reception of, but not limited to, non-compressed ultra high resolution video and multi-channel audio presentations over existing communication satellites. Because of the narrow bandwidth requirements of the system of the invention, the signals may be stacked for multi-channel access without the loss of signal quality or resolution normally encountered when compression techniques are used.

It will be understood that while a particular embodiment of the invention has been shown and described, modifications may be made. All such modifications which come within the true spirit and scope of the invention are intended to be covered by the following claims.

I claim:

1. A telecommunication system for analog input video signals, data signals, facsimile signals, and the like, comprising: a synchronous pixel analog modulator (SPAM) circuit for converting the analog input signals into a multi-bit multi-level discrete code signal; input means for introducing said analog input signals to said SPAM circuit; and a modulator/oscillator circuit connected to said SPAM circuit for modulating said multi-level discrete code signal on a carrier generated by said oscillator; said SPAM circuit including a ramp generator for generating a multi-bit multi-level ramp signal; and circuit means connected to said input circuit and to said ramp generator for sampling the difference between analog levels of the input signals and corresponding levels of the ramp signal from said ramp generator field for producing multiple synchronous outputs equal to the analog levels of the input signals; and a network connected to said circuit means and responsive to the outputs therefrom for forming said multi-bit multi-level discrete code signal.

2. The telecommunication system defined in claim 1 and which includes a stable crystal-controlled clock oscillator for introducing clock signals to said ramp generator and to said circuit means to insure synchronism in the system.

3. The telecommunication system defined in claim 1 in which said multi-bit multi-level discrete code signal is a 4-bit 16-level signal, in which said ramp generator generates an 8-bit 256-level ramp signal, and in which said circuit means comprises a quad comparator circuit for producing four multiple synchronous outputs.

4. The telecommunication system defined in claim 1 in which said transmission gate modulator circuit includes a carrier oscillator which produces a phase coherent burst of carrier signal at a predetermined carrier frequency which is directly proportional to the multi-bit multi-level discrete code signal.

* * * * *